US005233686A

United States Patent [19]

Rickenbach et al.

[11] Patent Number: 5,233,686

[45] Date of Patent: Aug. 3, 1993

[54] OPEN SYSTEMS SOFTWARE BACKPLANE ARCHITECTURE FOR FEDERATED EXECUTION OF INDEPENDENT APPLICATION PROGRAMS

[75] Inventors: Brent L. Rickenbach, Edina; Thomas E. Rosenthal, St. Paul, both of Minn.

[73] Assignee: Ceridian Corporation, Minneapolis, Minn.

[21] Appl. No.: 764,463

[22] Filed: Sep. 24, 1991

[51] Int. Cl.[5] .......... G06F 3/14

[52] U.S. Cl. .......... 395/158; 395/161

[58] Field of Search .......... 395/134, 135, 140, 141, 395/144-148, 153, 155-158, 159, 161; 340/721, 723

[56] References Cited

U.S. PATENT DOCUMENTS

| | | | |
|---|---|---|---|
| 4,317,114 | 2/1982 | Walker | 340/721 |
| 4,498,089 | 2/1985 | Stell | 358/22 |
| 4,811,240 | 3/1989 | Ballou et al. | 364/518 |
| 4,845,644 | 7/1989 | Anthias et al. | 395/157 |
| 4,899,136 | 2/1990 | Beard et al. | 364/900 X |
| 4,914,607 | 4/1990 | Takanashi et al. | 395/157 X |
| 5,036,315 | 7/1991 | Gurley | 395/157 X |

OTHER PUBLICATIONS

Hiebert et al., "Sharing Overlay and Image Planes in the Starbase/X11 Merge System", Hewlett-Packard Journal, vol. 40, No. 6, pp. 33-38 (Dec., 1989).

Control Data Corporation, "Interfacing to GLMX", Appendix C to Report for Advanced Reference Scene Products Program, U.S. Air Force Contract No. F30602-89-C-0093, Apr. 12, 1991, pp. C-1 through C-14.

Control Data Corporation, "Execution Procedures", Sections 3.0 and 3.1 to Report for Advanced Reference Scene Products Program, U.S. Air Force Contract No. F30602-89-C-0093, Apr. 25, 1991, pp. 7-13.

*Primary Examiner*—Heather R. Herndon

*Attorney, Agent, or Firm*—Kinney & Lange

[57] ABSTRACT

A plurality of computer application programs have respective display generation routines for generating respective program video displays onto a computer display screen. Backplane software operates all of the respective display generation routines to generate a overlayed, composite video display of the respective program video displays. The software system fuses the display outputs of each of a plurality of independent application programs into a single overlayed screen display. More particularly, the software backplane architecture interrupts the draw subroutine calling sequences of each independent application program, and redirects those sequences to the backplane software. The backplane software initiates a redraw command to the application program to in turn operate the display generation routines to cause a display. Since all of the independent application programs have draw sequences under control of the backplane software, the application programs remain independent of each other. A coordinates table provides offset coordinate and orientation data for each application program so that the program displays are offset by the correct amount and are oriented to like attitudes. The backplane software multiplexes the input devices to each subscribing independent application program integrated into the architecture. Each application program executes in the originally designed code and language and executes on input commands as if it were a stand-alone, un-integrated application program.

42 Claims, 8 Drawing Sheets

Microfiche Appendix Included (150 Microfiche, 4 Pages)

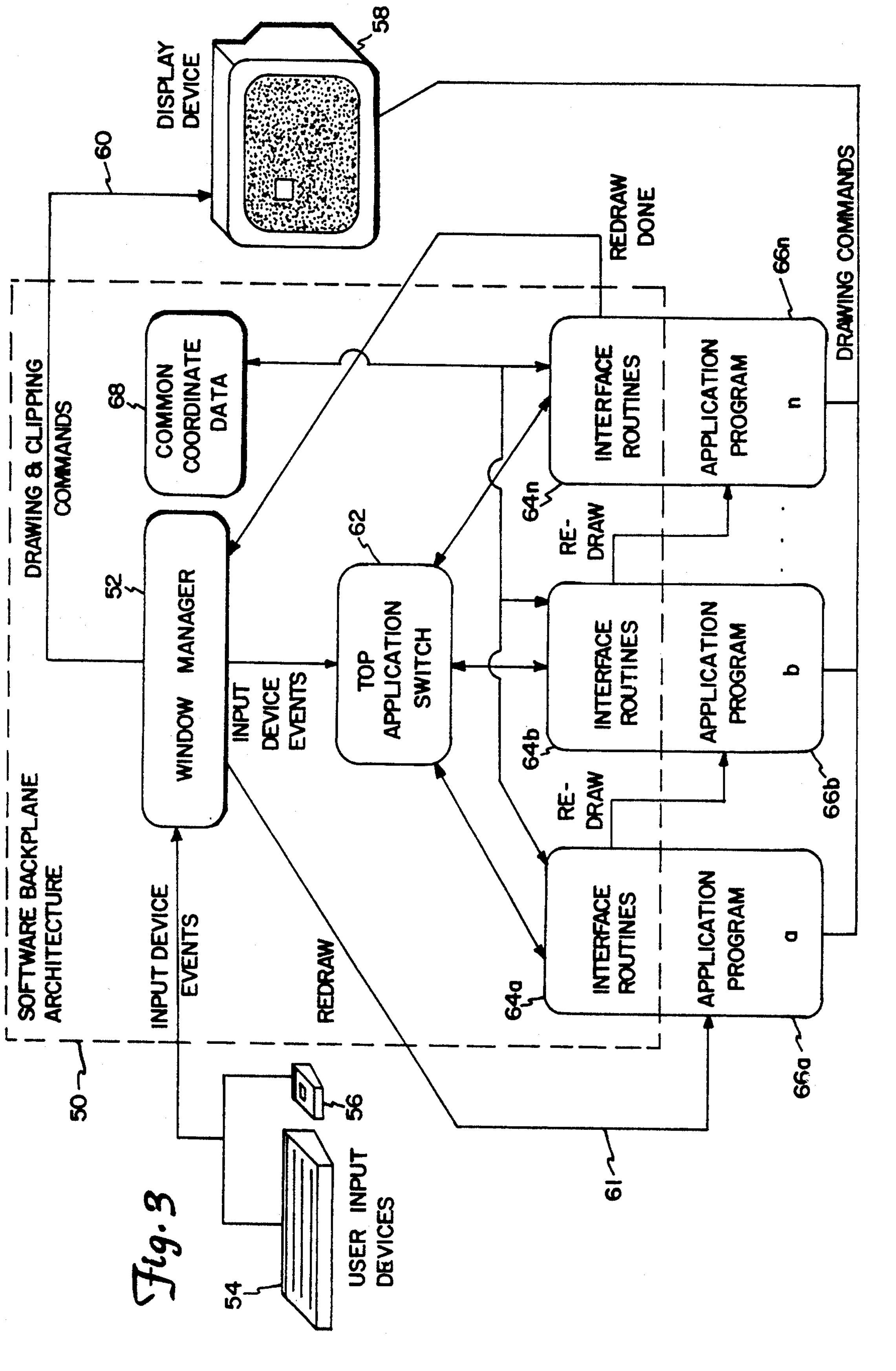
Fig. 3
SOFTWARE BACKPLANE ARCHITECTURE
50
DRAWING & CLIPPING COMMANDS
60
DISPLAY DEVICE
58
68
COMMON COORDINATE DATA
52
WINDOW MANAGER
INPUT DEVICE EVENTS
62
TOP APPLICATION SWITCH
REDRAW DONE
INTERFACE ROUTINES
APPLICATION PROGRAM
n
64n
66n
DRAWING COMMANDS
RE-DRAW
INTERFACE ROUTINES
APPLICATION PROGRAM
b
64b
66b
RE-DRAW
INTERFACE ROUTINES
APPLICATION PROGRAM
a
64a
66a
INPUT DEVICE EVENTS
REDRAW
56
61
54
USER INPUT DEVICES

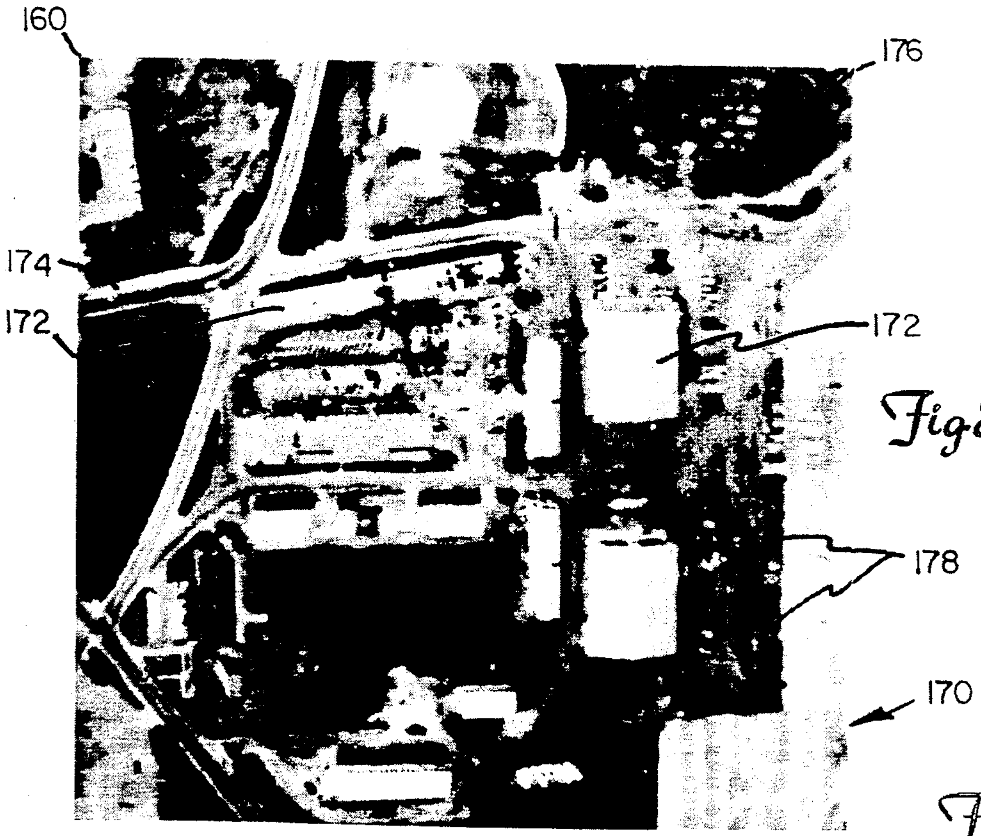
Fig 8A
Fig. 8C
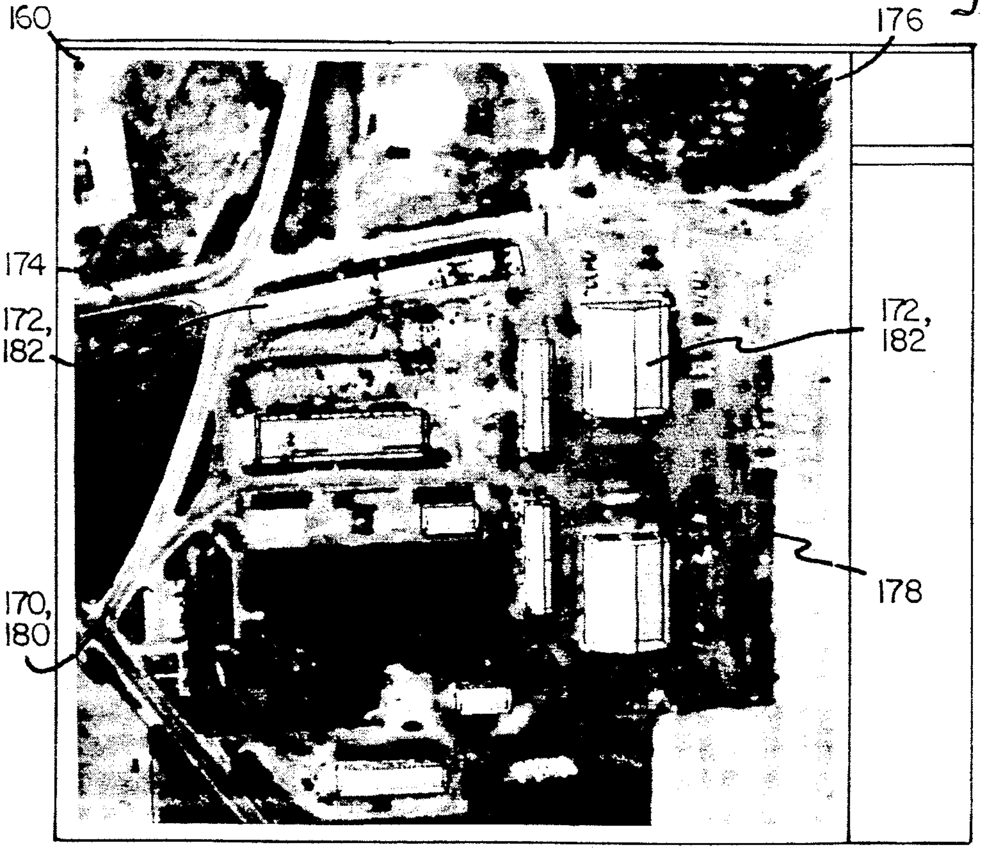

OPEN SYSTEMS SOFTWARE BACKPLANE ARCHITECTURE FOR FEDERATED EXECUTION OF INDEPENDENT APPLICATION PROGRAMS

MICROFICHE APPENDIX

Appended to this patent document are 4 sheets of microfiche containing 346 frames setting forth computer code.

BACKGROUND OF THE INVENTION

This invention relates to a software system by which a plurality of independent application program modules may be integrated for federated execution and display, and particularly to a software system which fuses the display outputs of a plurality of independent application programs into a single overlayed screen display.

The invention is also useful in connection with a windowing management system to overlay displays generated by a plurality of independent application programs within a single window or display area.

In the display of computer-generated data, it is known that the display screen can generate displays in any given display area from the display generation routines of a single program. This is accomplished by executing the draw or display function at screen coordinates specified by the application program. Graphical displays are generated using a graphics program, which may include a plurality of subroutines representing graphical representations, such as icons. Other programs include camera models, two-dimensional coordinate subroutines, and three-dimensional coordinate programs for generation of displays based on input data. Overlay subroutines of some programs permit overlaying the displays in a "graphics-on-graphics" format. The display generation routines for the graphics program include pre-draw (get ready) and draw routines to generate graphical images on the display screen in accordance with the program commands. The plurality of templates and subroutines are imbedded in the individual graphics program. As the nature, number and complexity of the subroutines increase, so does the complexity of the graphics generation subroutines.

One of the difficulties with prior systems is that it has become increasingly difficult to alter the program, as well as subroutines within the program, without adversely affecting other parts of the program, or subroutines therein. The reason for this increased difficulty is that as users require increased versatility and functionality of the display, the application programs have become more complex in functional execution, as well as in input interface and coordination between program subroutines requesting greater numbers and more varying inputs and commands. Moreover, the user interface of the program had to be modified and expanded to accommodate the growing number and types of input devices. With the increasing size and complexity of the graphics programs, including that program's user interfaces and display generation routines, it became increasingly difficult to modify the program without adversely affecting other portions thereof. More particularly, a software developer, not fully familiar with the intricacies of the entire program, could create program errors by the addition of templates or subroutines or the correction of other code in the graphics program. As the collection of interactive program functions became more numerous and complex, it has become increasingly difficult for a single programmer to maintain the knowledge necessary to effectuate a change in the program without adversely affecting other parts thereof.

One well known technique for displaying data from a computer output employs the use of plural windows which are juxtaposed or partly occluded, for purposes of orderly presentation of the display of data to the user. A typical windowing treatment employs a windowing management system, which is a computer program designed to control the size, shape and position of each of the plurality of windows on the individual display screen. The windowing management system assigns a single program to each window, each program having its own user interfaces and display generation routines to effectuate input and processing of data, in manners specified by the program, and to generate displays of outputs in the individual window. The windowing management system ensures each display is maintained within the bounds of the assigned window.

In the use of a typical windowing system, the user selects the size and position of each window, including occluding the windows themselves, and, through access of each of the individual programs, manipulates the data display for each individual window. More particularly, the processor, operating under control of program permits the input of data, execution of specific desired operations using that data, and display of the results in a desired manner in window A on the display screen. To effectuate displays in window B, the processor executes under control of program 2 to input and process data and effectuate a desired display in window B on the display screen. Each window may be employed for textual display, graphical display, or a combination thereof, depending on the capabilities of the program employed. A hand-held "mouse" control, or other pointing device, is often employed to effectuate operations in a given window, usually in conjunction with a series of displayed commands appearing at an edge of the window ("menu"). A mouse is often used to define the position and size of the window, as well as to define graphs and tables, generate lines, and move displayed images within a window.

Windowing software, while permitting graphical display from several programs, did not display outputs from several programs in a registered, overlayed fashion. Instead, the several displays were juxtaposed for comparison by the user, or were pre-registered by a memory device for display under control of a single program. Windows permitted independent application programs for each window. Consequently, there is a need for a program technique by which diverse input devices provide input for complex execution to generate complex displays, yet which permits additions and changes to the program by persons unfamiliar with other parts thereof, without adversely affecting the program. However, this need has not been met using a single program under the control of a single processor to drive the single window.

Certain prior windowing management systems, such as X-Windows, permitted users to generate displays of outputs from two independent application programs anywhere on the display screen. While such windowing systems would seemingly not preclude two or more programs from drawing in a single window, such windowing systems did not provide support to do so. Thus, windowing systems provided no ability for the displays of two or more programs to independently share windows or to coordinate displays. Nor have windows systems solved problems associated with input commands adversely affecting the several programs, or the difficulties with redraw commands to the several programs, among other problems.

SUMMARY OF THE INVENTION

In accordance with the present invention, a software system fuses the display outputs of each of a plurality of independent application programs into a single overlayed display. More particularly, the backplane software architecture provides an interrupt of the draw subroutine calling sequences for each independent application program, and redirects those sequences to the backplane software so that backplane integration/interlock routines are called instead. When a redraw subroutine is subsequently called by the independent application program, a redraw command issued by the backplane software to the application program operates the display generation routines to cause a display. Since all of the independent application programs have draw sequences under control of the backplane software, the application programs remain independent of each other, yet the components of the display are in registration to provide a composite display.

One feature of the present invention resides in the provision of a coordinates database which manages the coordinate data for each display. The display coordinates supplied by each application program for individual display generation are offset by the coordinate data from the database. Consequently, the separate displays generated by the separate programs are merged into an overlay display by the coordinate database to create a fused display of several components generated by the separate programs.

Another feature of the present invention resides in the use of orientation data to orient the attitude of the display generated by each application program in a uniform manner.

Another feature of the invention resides in the backplane software multiplexing the input devices to each subscribing independent application program integrated into the architecture. Each application program executes the input interface code as developed by the original designer and executes input commands as if it were a stand-alone, un-integrated application program.

Another feature of the present invention resides in the fact that the individual programs are individually processed and need not be compatible with each other, either in code or language. The individual programs may, if desired, be processed on separate processors for display in a single window. Hence, the invention is adaptable to parallel processor systems.

Another feature of the invention resides in the use of a windowing management system in which plural windows may be employed, with some or all of the windows selectively operating under the control of the backplane software. The displays generated by plural programs may be overlayed in selected windows, while other windows remain under control of distinct, single programs as in the prior art. The windows with overlayed and non-overlayed displays may be occluded, juxtaposed, or positioned in any other configuration under control of the windowing management system, as is well known in the art.

BRIEF DESCRIPTION OF THE DRAWINGS

FIG. 3 is a diagram illustrating the concept of an open systems backplane architecture in accordance with the present invention.

FIGS. 8A–8C are plan view of a display screen illustrating the effect of stacking and fusing displays generated by separate application programs.

DETAILED DESCRIPTION OF THE PREFERRED EMBODIMENTS

The present invention is carried out employing backplane software written as a modification to a windowing software, the windowing software and backplane software being written in PostScript interpreted code. The windowing software is the Sun NeWS Network Extendible Windowing System available from Sun Microsystems, Inc., which has been modified by Silicon Graphics Computer Systems Inc. The backplane software comprises changes to five modules of the described Sun NeWS windowing software, and the addition of four additional modules. The invention also employs subroutines inserted into independent application programs written in C code to permit those application programs to operate with the backplane software as described herein. The software operates on a CYBER TM 910 computer available from Control Data Corporation of Minneapolis, Minn., configured with a Unix operating system.

The appendix is a microfiche of a printout of those modules of the Sun NeWS windowing software which have been changed, and the additional modules, written in PostScript, as well as the C-code subroutines for application programs, all for carrying out the present invention. The appendix contains material which is subject to copyright protection. Facsimile production of the patent document or patent disclosure, as it appears in the Patent and Trademark Office file or records, may be made by anyone, but otherwise the owners reserve all copyright rights whatsoever.

The present invention is directed to a backplane software architecture to permit execution of a plurality of independent application programs for the plural independent display of outputs from each independent application program to generate a single, federated display. While the invention is useful as a display tool, independent of windowing systems, the invention will be described in conjunction with the windowing system, such as above-described modified Sun NeWS windowing system.

Figure 1:
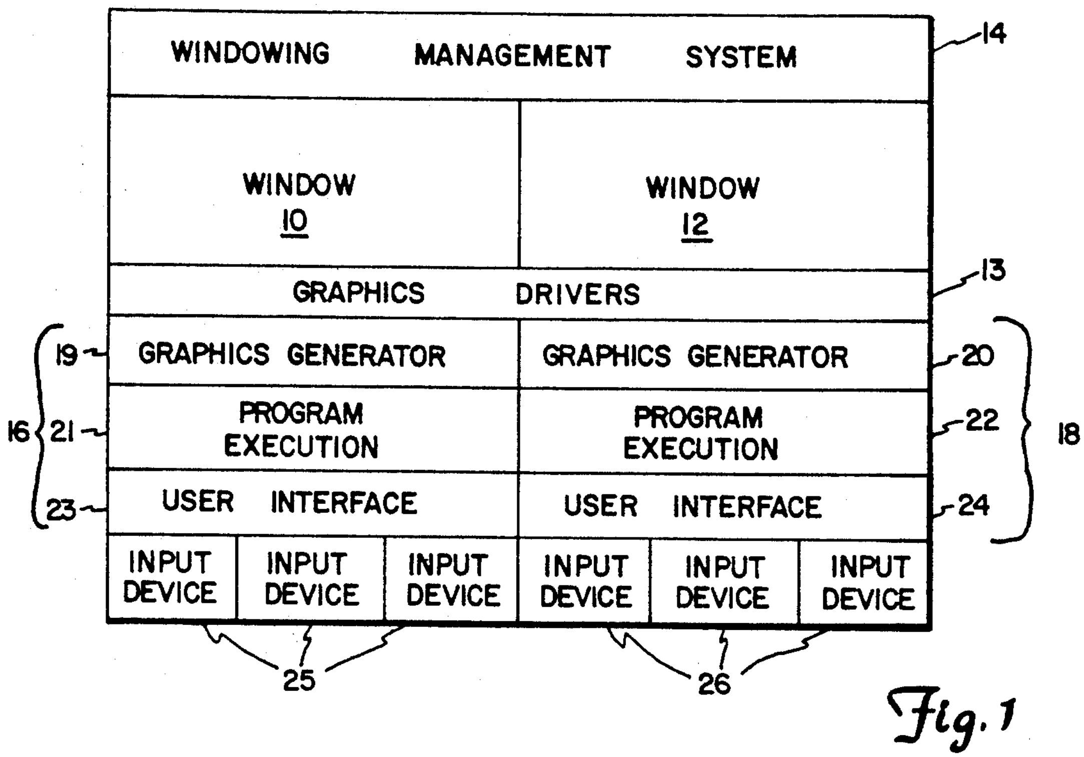
FIG. 1 is a diagram illustrating the concept of a typical computer display windowing system of the prior art.

FIG. 1 illustrates a conceptual layout of a typical windowing system where a display screen (hardware) is divided into a plurality of windows 10 and 12, whose displays are generated by graphics driver 13 (hardware) under the management of a windowing management system 14 (software), such as the Sun NeWS software. Application programs 16 and 18 each has a graphics generation routine 19, 20 (software) which operates graphics driver 13 to generate an output display in the respective window. The respective output display is generated based on the computational output of the program execution unit 21, 22. User interfaces (software) 23, 24 for each program 16, 18 provides interface to the user input devices 25, 26 for each application program. User input devices 25, 26 are suitable input devices such as keyboards, mouse controls (pointing devices), tape and disc drives, sensors, and other input hardware for inputting data and commands to the respective application program 16, 18. Windowing management system 14 assigns a single window to each application program 16 and 18. Each program has its own user interface and graphics generator to effectuate input and processing of data in a manner specified by the application program and to display outputs in the individual window. Windowing management system 14 assigns a program to the window and controls the size and position of each window and assures that the displays generated by graphics generators 19 and 20 are confined to the bounds of their respective windows 10 and 12. Windowing management system 14 further permits the user to switch into, out of and between application programs 16 and 18 so that input devices such as the keyboards and mouse controls may be operated with each application program successively. The windowing management system 14 also permits the user to operate controls to permit changing the size and position of the respective windows, occluding the windows, and other functions well known in the art.

The windowing management system 14 of the prior art was not capable of effectively operating plural independent programs in a single window. More particularly, users of prior windowing management systems were not able to simultaneously display outputs from plural independent application programs in a single window in an overlayed, registered fashion. While sophisticated overlays were possible employing templates and other features of a single application program, these programs were necessarily limited in design and versatility to the single program provided by the software developer. As the complexity of graphics programs increased, and particularly as the displays became more complex due to overlaying of displays, it became increasingly difficult to change or modify the application program or to customize the application program for a given user's requirements.

Figure 2:
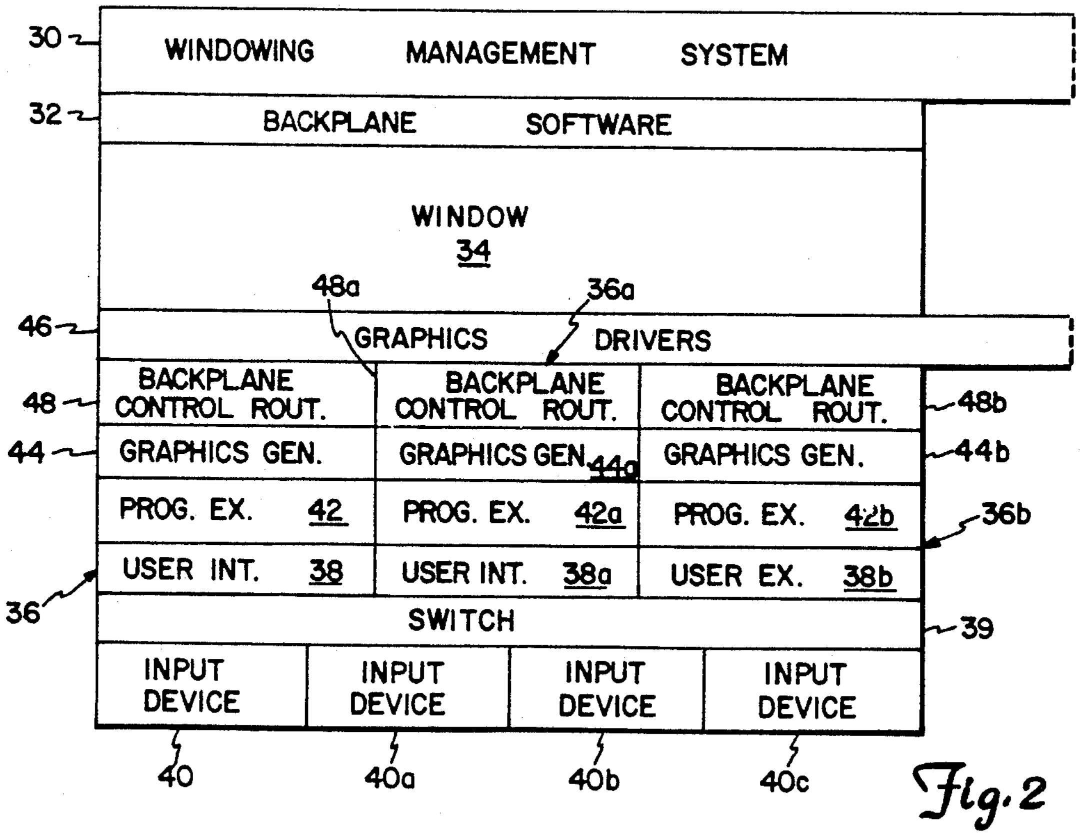
FIG. 2 is a diagram illustrating the concept of a computer display windowing system incorporating an open systems backplane software architecture in accordance with the present invention.

FIG. 2 illustrates a conceptual layout of a windowing system in accordance with the present invention. While FIG. 2 illustrates a single window, it is understood that plural windows may be employed on a single display screen in a manner well known in the art. The system of FIG. 2 employs a windowing management system 30, such as the Sun NeWS windowing management system of the prior art. Backplane software 32 in accordance with the present invention is provided as a r: anager for the displays in an individual window 34, which is a window formed on the computer display screen. A plurality of independent application programs 36, 36*a*, 36*b* each includes independent user interfaces 38, 38*a*, 38*b*, program execution routines 42, 42*a*, 42*b*, and graphics generator routines 44, 44*a*, 44*b*. Each user interface 38, 38*a*, 38*b* is connected through multiplexing switch 39 to receive data and commands from input devices 40, 40*a*, 40*b*, 40*c* to operate execute a program execution routine 42, 42*a*, 42*b*. The respective graphics generator routines 44, 44*a*, 44*b* operate graphics drivers 46 of display terminal 58 to generate displays to write (or draw) on window 34. Backplane control routines 48, 48*a*, 48*b* for each program 36, 36*a*, 36*b* operates with backplane software 32 to control and direct displays generated by the individual programs so that the several displays fuse in the display window in an overlapped, registered fashion, with each individual program display providing a layer in a stack of overlapped displays in a manner to be described herein. More particularly, an image is displayed as a background display, the image data writing into substantially all pixels in the display window. The overlayed (foreground) displays are transparent graphics displays which overwrite onto selected pixels in the display window. Each pixel not overwritten by an overlay transparency continues to display the background image.

The windowing software concept illustrated in FIG. 2 permits each of a plurality of independent application programs 36 to execute on input data and commands from its respective user input devices to generate a display layer in window 34 which is independent of the display layers generated by each of the other independent application programs 36. Each application program obtains data and commands, executes program functions, and generates display commands without interface with the other application programs. Consequently, the several independent application programs 36 do not need to be written in the same language (provided the display generation routines are compatible to the display apparatus), and do not need to reside or execute on the same processor.

Window 34 displays a stack of independent overlapped displays, each layer being supplied by an independent program 36. Some of the layers of the stack may be images, others may be depictions of user database contents, others may be textual, others graphical depictions which are the result of camera, 3-dimensional or 2-dimensional input from various sources. As will be explained hereinafter, the order of layering of the stack of displays affects the manner of redrawing displays, as well as the manner of input of data and commands to each individual program. Also, as explained hereinafter, one of the layers is designated a background layer, whereas the other layers are foreground layers. The order of layering amongst the foreground layers may be altered as will be explained hereinafter.

FIG. 3 illustrates a layout of the backplane software architecture in accordance with the presently preferred embodiment of the present invention. The backplane software 50 includes a window manager 52 which receives inputs from one or more user input devices such as keyboard 54, mouse 56, or any other suitable data or command input device. Input device events from input devices 54, 56 are forwarded through the window manager 52 through top application switch or software switch 62 to a selected one of interface routines 64*a*, 64*b*, . . . 64*n* associated with a respective independent application program 66*a*, 66*b*, . . . 66*n*. Each independent application program includes a user interface for receiving input data and commands from input devices 54,56, program execution units for executing on the data and commands in a manner prescribed by the program, and a graphics generation routine for effectuating the generation of a display on the display screen through the graphics drivers associated with display terminal 58. The backplane software includes a dynamic table 68 containing common coordinate data and orientation data, the coordinate data representing coordinates of displays within the window, and the orientation data representing an orientation or attitude of the display. This data is provided to each of the interface routines 64a, 64b, . . . 64n associated with each independent application program. Window manager 52 provides drawing and clipping commands to the display device or terminal 58 via bus 60. Window manager 52 is also connected to provide redraw commands to each of the independent application programs via bus 61. As will be explained hereinafter, the application program displays are redrawn in succession, so that upon completion of the redraw command in one program a redraw done command is returned to window manager 52, whereupon the window manager commands the next independent application program to perform a redraw function. For simplicity, the concept of successive redraw commands is illustrated in FIG. 3 as cascading through the independent application programs, with the redraw done command returning from the last independent application program 66n, but it is understood that redraw commands are actually issued by window manager 52 for each successive application program in a manner to be explained. Each independent application program 66 generates a display output through its respective display generation routines to command a display at selected coordinates of display screen 58.

Prior to the present invention, when it was required that an application program redraw its display, the program either executed the output graphic calls that draw data onto its display window, or it placed a draw token into its own event queue. The draw token was serviced when recognized by the program on subsequent passes through its own loop. In accordance with the present invention, interface routines 64a, 64b, 64n (FIG. 3) modify the respective application program 66 so that redraw process calls of the application program are interrupted and exchanged for calls to the interface subroutines 64. As shown particularly in FIG. 4, when an application program draw or redraw requirement flag is set, as at step 70, the flag is interrupted by interface routine 64 associated with the independent application program, and a redraw stack call command is sent to window manager 52 of the backplane software (step 72). At step 74, window manager 52 returns a redraw token (via bus 61) to the bottom or lowest program of the stack of the independent application programs (which is usually the background, image layer). This has the effect of placing a redraw command token into the event loop of the independent application program to permit execution of the redraw routine by the independent application program (step 76). The process performed at step 76 is described in greater detail in connection with FIG. 5, and includes execution of displays at screen coordinates based on offset coordinates supplied by coordinate table 68 (FIG. 3). Step 76 also includes obtaining orientation data from table 68 to align the orientation for all displays. Thus, independent application program 66 executes the clearing and redrawing of information in its display window in accordance with the instructions of the application program in its own code. Hence, the backplane architecture permits independent execution of the display generation routines of each independent application program 66, but transformed so as to merge with outputs of other independent application programs in the integrated window controlled by the backplane software.

When the redraw operation at step 76 is completed and the backplane software notified (step 78), window manager 52 of the backplane software determines, at step 80, whether or not there is an application program having a window layer higher than the current level. If an application program exists with a higher window layer than that just executed, a redraw token will issue at step 82 to that application program to execute redraw routines in that next higher application program (step 76). Thus, when an application program initiates a draw or redraw function is initiated, window manager 52 of the backplane software operates to effectuate a draw or redraw function by each independent application program for each successive higher window layer in the stack. Each layer above the image layer is a transparent display which overwrites on selected pixels in the window, thereby permitting the image background display to remain visible on the undisturbed pixels. Thus, when the redraw complete command is received from an application program which generated a the draw or redraw function, window manager 52 determines, at step 80, whether or not there is a higher level independent application program. If no program has a higher window layer, the stack redraw is halted and the process ends at step 81. If an application program has a higher window layer, window manager 52 issues a redraw token (step 82) to the application program having the next higher layer in the stack, thus paralleling the function at step 74. That application program executes its redraw through its display generation routines as previously described, and the process continues through the loop illustrated in FIG. 4 until redraw functions are completed in all higher application programs and the process exits at step 81.

Figure 4:
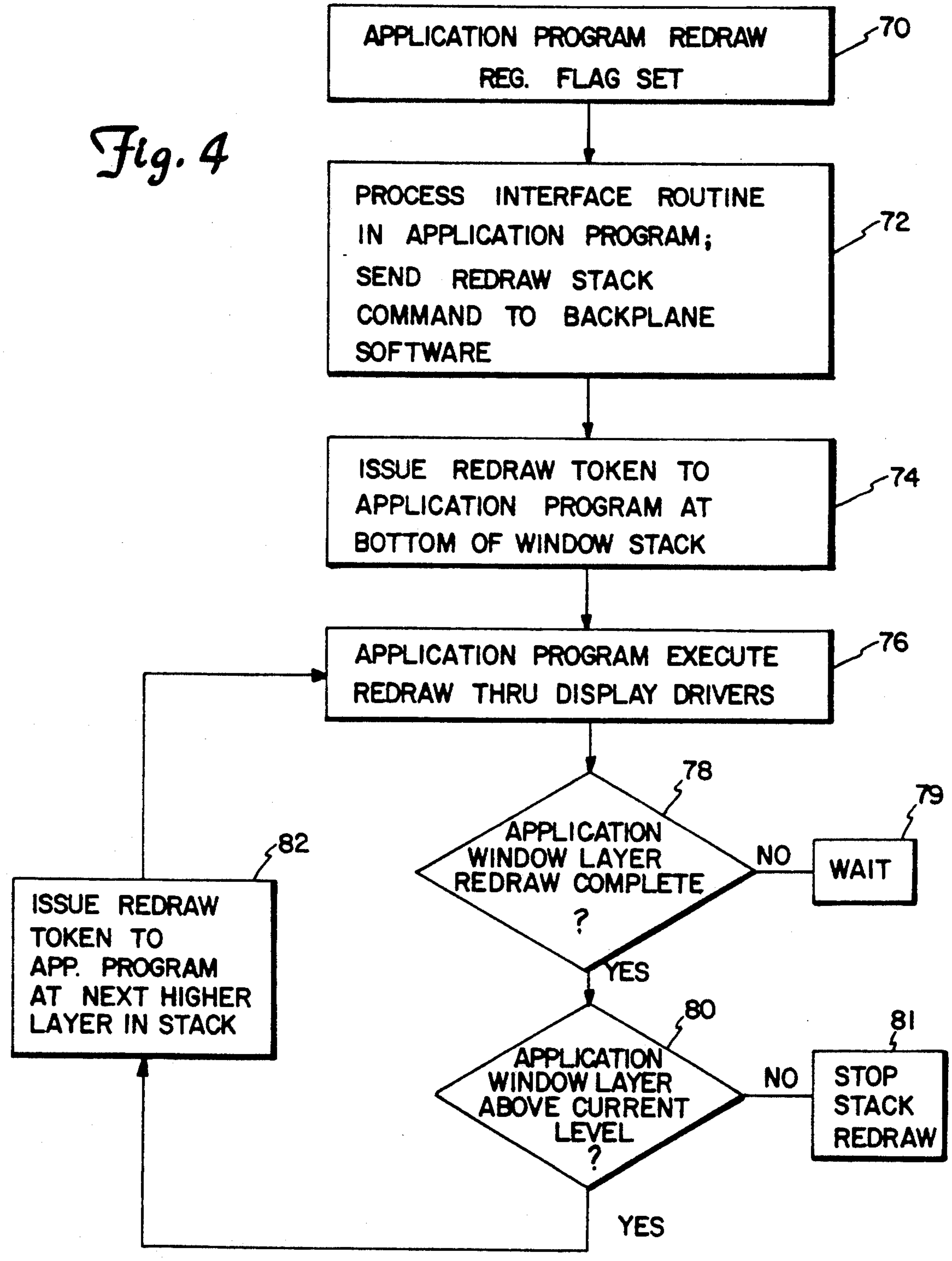
FIGS. 4–6 are flow diagrams of the backplane software and application program subroutines in accordance with the presently preferred embodiment of the present invention comprising the open systems backplane architecture in accordance with the present invention.
Figure 5:
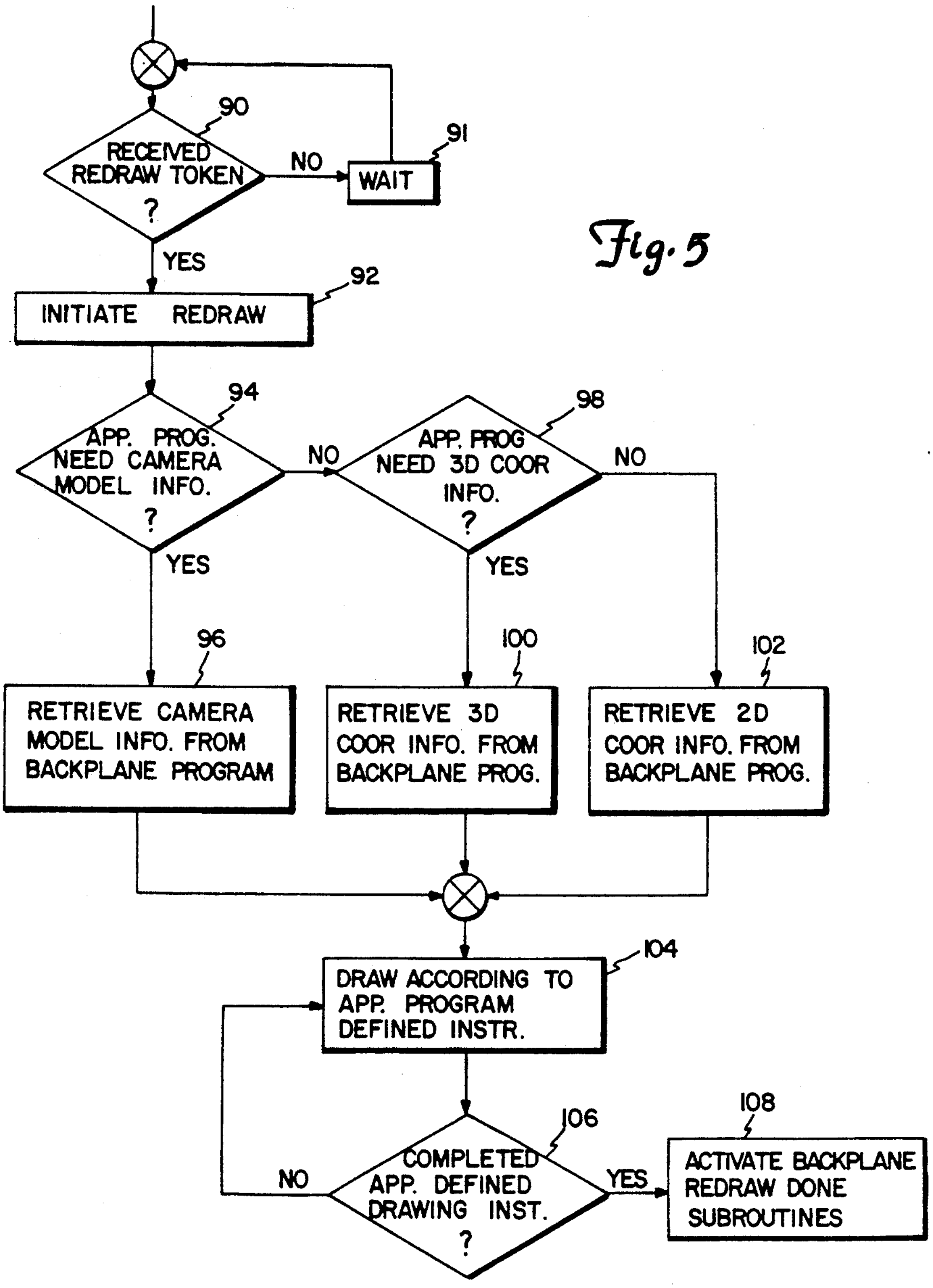

The execution of the independent application program (step 76 in FIG. 4) is illustrated in greater detail in FIG. 5. When a redraw token is received from step 74 in FIG. 4, placed in the queue of the independent application program and recognized for processing (step 90), redraw is initiated at step 92 by the independent application program. Several options are available, depending upon the functional nature of the application program and its need for particular information to intelligently fuse its output information within the window display 34 (FIG. 2). If application program 66 requires three dimensional camera modeling information to support transformation of three-dimensional graphics output information, information is obtained at step 96 from the backplane software, and particularly from the common coordinates table 68 (FIG. 3), to extract information from the backplane software for the reference image that is currently baselining camera model for the display window. Likewise, at steps 98 and 100, three-dimensional data may be accessed from table 68 and at step 102 two-dimensional information may be obtained from table 68.

The data obtained from table 68 includes coordinate data and orientation data. Each program includes coordinate data indicating the position of the program's display on the display screen (if not under control of the management system of the present invention), and includes orientation data representative of the orientation (attitude) of the display. The program coordinate data is the data representing the screen coordinates where the program will draw the representation of an object if the program is not under control of a windowing management system. The program orientation data is the data representing the orientation of the object to be drawn (i.e., the direction from which the object will be viewed) in absence of a windowing management system according to the present invention. The data from table 68 provides reference coordinate offset information to permit the displays to be drawn in the proper position, and includes orientation information to permit the displays to all appear at the same orientation. Consequently, the backplane software controls the displays from the collection of independent application program outputs so that the graphics and text outputs are fused within window 34 under control of the backplane software. Each application program display is layered (as opposed to merged) into the window by the backplane software as an independent display layer of the window. The plural display layers are interlocked in a federated manner so that the several independent display layers appear fully registered to each other.

Each program is executed in its own code at step 104 until completed at step 106 whereupon a redraw done call is performed by the application program through the interface routine 64 to the backplane software, and particularly to step 78 of FIG. 4. The redraw operation continues through the independent application programs having window layers successively higher in the stack order until termination of the redraw activity, as previously described.

One feature of the invention is that the application programs available for drawing may be selectively switched in and out (on and off) of the display stack. The user may selectively switch display layers into and out of the stack. On redraw, only those layers which are switched into the display are redrawn. More particularly, in issuing the redraw token at step 82 (FIG. 4), the software issues that token only if the program to receive the token is on or active in the window. Additionally, several background display (image) programs may be alternately switched onto the display stack. Only one background display is generated at a given time because the background displays write onto substantially all the pixels. As the user turns on a given background display, the software switches off the existing background display.

Figure 6:
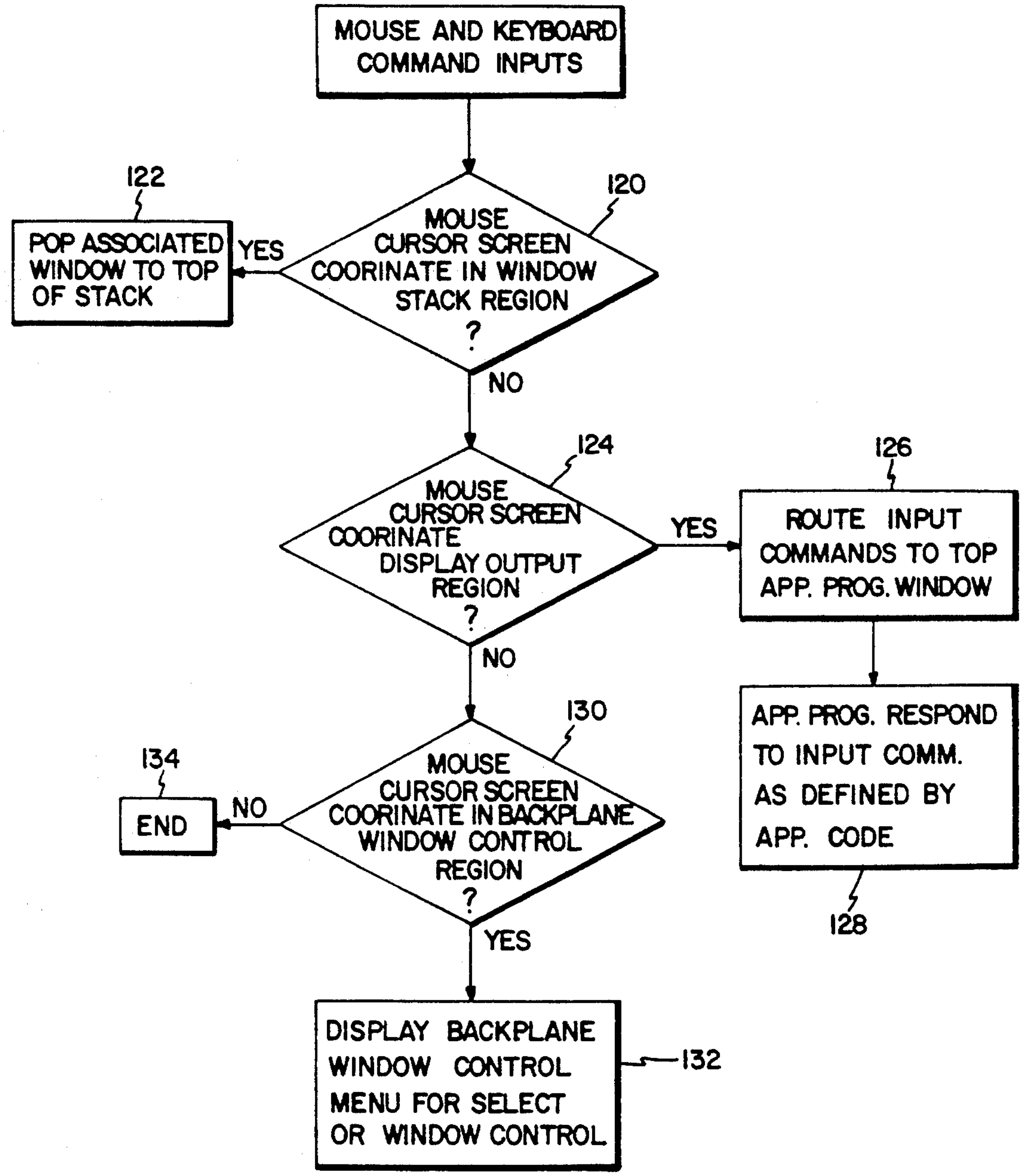

FIG. 6 is a flow diagram illustrating the management of the interface to the user input devices. As previously described, the window layers generated by independent application programs 66 are arranged in a stack. User input devices such as keyboard 54 and mouse 56 (FIG. 3) are routed (multiplexed) through the backplane window manager 52 and software switch 62 to that interface routine 64 associated with that independent application program 66 whose window layer is highest in the stack. The routine of FIG. 6 illustrates the manner by which any selected independent application program, other than that program which generates the background layer, is promoted to :he top of the stack so that it may respond to user input commands. Promoting an independent application program to the top of the stack is accomplished with an input device, such as a mouse control.

Figure 7:
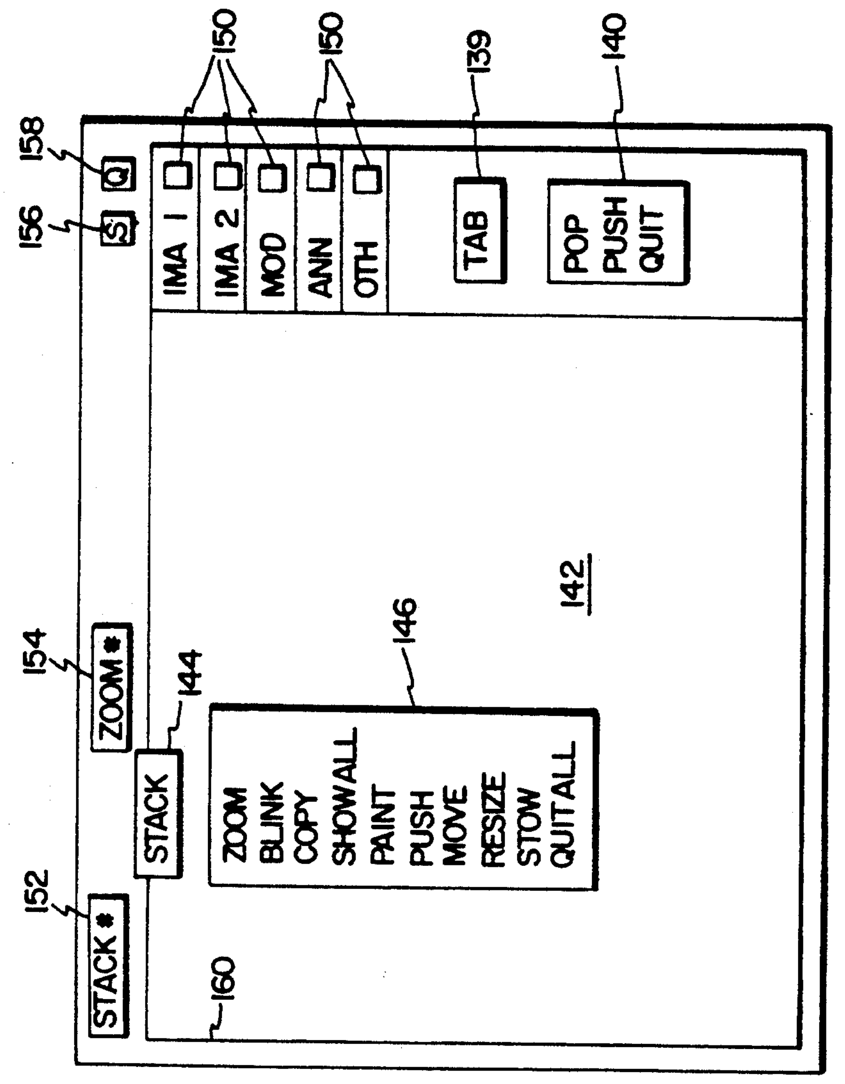
FIG. 7 is a view of a display screen window menu for the software and subroutines of FIGS. 4–6.

The processes of FIG. 6 can best be explained in conjunction with the display screen illustrated in FIG. 7. At step 120, if the mouse is operated when its cursor screen coordinates are in tab function 139, window stack control menu 140 turns on whereupon when the mouse control is again operated when its cursor screen coordinates are in the window stack control menu 140 of a selected independent application program, operation of the mouse control will "pop" the associated application program to the top of the backplane stack, at step 122, moving all other application programs previously ahead of the "popped" program down one step in the stack. However, if, at step 124, the mouse cursor screen coordinates are in display output region 142, then mouse control and other keyboard input commands are routed by software switch 62 (FIG. 3) to the application program at the top of the stack (step 126). That application program executes in response to the input device event as defined by the application program code. If, at step 130, the mouse cursor screen coordinates are in the stack control region 144, operation of the mouse control (step 132) will display the window stack menu 146 for selection by the user of the various window controls. Operation of the mouse control when the mouse cursor screen control is outside window stack region 140, display output region 142 and backplane window control region 144 indicates that the mouse coordinates are in a region outside window 34 (FIG. 2), thereby ending the input control program (step 134).

The screen display illustrated at FIG. 7 depicts the stack menu 146 identifying the various window controls which can be accomplished on the stack. The controls identified in FIG. 7 are, of course, merely examples of the controls which might be incorporated into the window control. Operation of the mouse control when its cursor screen coordinates are in menu 146 will select that function to operate on the entire fused display of the entire stack. For example, if a Zoom command is selected to alter the zoom resolution of the display, all layers of the display in the window are correspondingly altered. This is accomplished by initiating a redraw function with changed offset coordinates from table 68 (FIG. 3) to the application program whose display is at the bottom of the stack, and redrawing each layer higher as previously described. Other functions performed by the window stack control (menu 146) include a "Blink" command which permits a copied version of the window to be alternately displayed with the current contents on a regular timed basis, so that the displays alternate in prominence; a "Copy" command saves a copy of the stack display; a "Show All" command which restores a window from a previous zoom command to display the entire unzoomed window; a "Paint" command which initiates a redraw function; a "Push" command which occludes the display windows; a "Move" command which moves a window; and "Resize" command which changes the size of the window; a "Stow" command which iconifies the window and moves it to another screen location; and a "Quit All" command which performs a quit command to the entire window.

The regions identified at reference numeral 150 designate various indicators concerning operation of the display and input controls. Conveniently, a stack identification number is displayed at indicator 152 to identify the stack in the window, and the zoom factor is displayed at indicator 154 Items 156 and 158 provide a "Swap" and "Quit" commands. The Swap function is similar to the Blink function previously described except that the Swap function permits manual alternating the foreground position of two or more foreground application programs, whereas the Blink function cause the alternating to occur automatically and at regular timed intervals. The Quit function is identical to the Quit All function of stack menu 146, but can be accessed without accessing the stack menu.

One feature of the present invention resides in the common control of the display generated by the independent application programs. Since the coordinates of the displays generated by each independent application program are offset by the coordinates from coordinate table 68, the several displays can be manipulated in unison under control of the backplane window control. More particularly, by adjusting the offset coordinates, all overlapping displays may be controlled to occur at a common position on the display screen and displays not intended to overlay are segregated. Also, since orientation data for the displays are provided by table 68, all component display layers are oriented at the correct orientation. Each program uses the offset coordinate and orientation data from table 68 to create a display matrix to generate a display layer of proper orientation, size and position on the screen. Moreover, the orientation for all of the layers of the display may be changed merely by changing the orientation data in table 68 for all layers. For example, a composite display may be rotated to alter the orientation of the composite display merely by changing the orientation data in table 68.

Pixel 160 (FIG. 7) is the pixel element at the upper left corner of the display generated by the application program having the lowest level display in the window. Pixel 160 defines the upper left corner of display output region 142 of the display screen. The screen coordinates of pixel 160 are inputted into table 68 (FIG. 3) to provide a reference for the coordinate offset for the higher layer displays provided by the other application programs. Should it become necessary or desirable to move the display, and hence the coordinates of pixel 160, new coordinates are inputted into table 68. Thus, the application program defining the window coordinate and pixel 160 is the background display, the other application programs generate foreground displays.

As heretofore described, each program includes orientation data defining the orientation of the intended display. The orientation data is used to create a display matrix for displaying the object. Initially, the orientation data from the background program is inputted into table 68 so that each higher level display assumes the same orientation as the background display. However, the user may change the orientation of the display by using the mouse control or by substituting the orientation data of another program, thereby changing the orientation data in table 68 and hence the orientation of the composite display. Likewise, the user may change the location of the display by changing the pixel information previously associated with pixel 160.

The initiation of a window according to the present invention and the attachment of an independent application program to an existing window each occur as a subprocess to the normal procedure of calling an application program which is part of an existing window. By executing a root menu or a direct textual command, a "Script" routine to calls up a selected application program. The "Script" routine may include a pre-assigned stack identification number, or no number at all. In either case, the application program calls the backplane software to create a window stack. If a stack identification number is present, a stack number flag is set. In addition a "Special Window" flag is set to indicate that the window opened in not a standard NeWS window.

The setting of the "Special Window" flag calls the standard window routine in the standard graphics library, which in turn calls the windowing management software to look for the "Special Window" flag and branch to the backplane software window opening routines. If the stack number flag is set, the backplane software attaches to an existing stack with the assigned stack identification number (if such a stack exists) or creates a new stack with the assigned stack identification number (if no stack with that number exists). If the stack number flag is not set, the backplane software generates a special icon to permit the user several options to integrate the application program into a window.

With the special icon under the control of a mouse control, the user may create a new window stack by operating the control in a non-windowed area of the screen. Alternatively, the user may attach the application program to an existing window stack by operating the mouse control when the special icon is in the window boundary of the stack to which the user wishes to attach the application program. If a new window is to be created, the initiation routines create a stack window in which application programs displays are integrated with the display generated by that program initiating the window. Each application program subsequently added to the stack assumes a place and status within the stack of greater priority and status that any previous programs integrated within the window. Thus, the application program opening the window generates the initial background display layer and sets the position of pixel 160, thereby setting offset coordinate data in table 68 for the offsetting the coordinates for the subsequent programs. It also establishes the orientation data for orienting the displays for the other layers generated by other programs.

When a window is opened, a graphics window identifier is returned to the backplane software to identify the graphics window to other graphics functions.

Figure 8B:
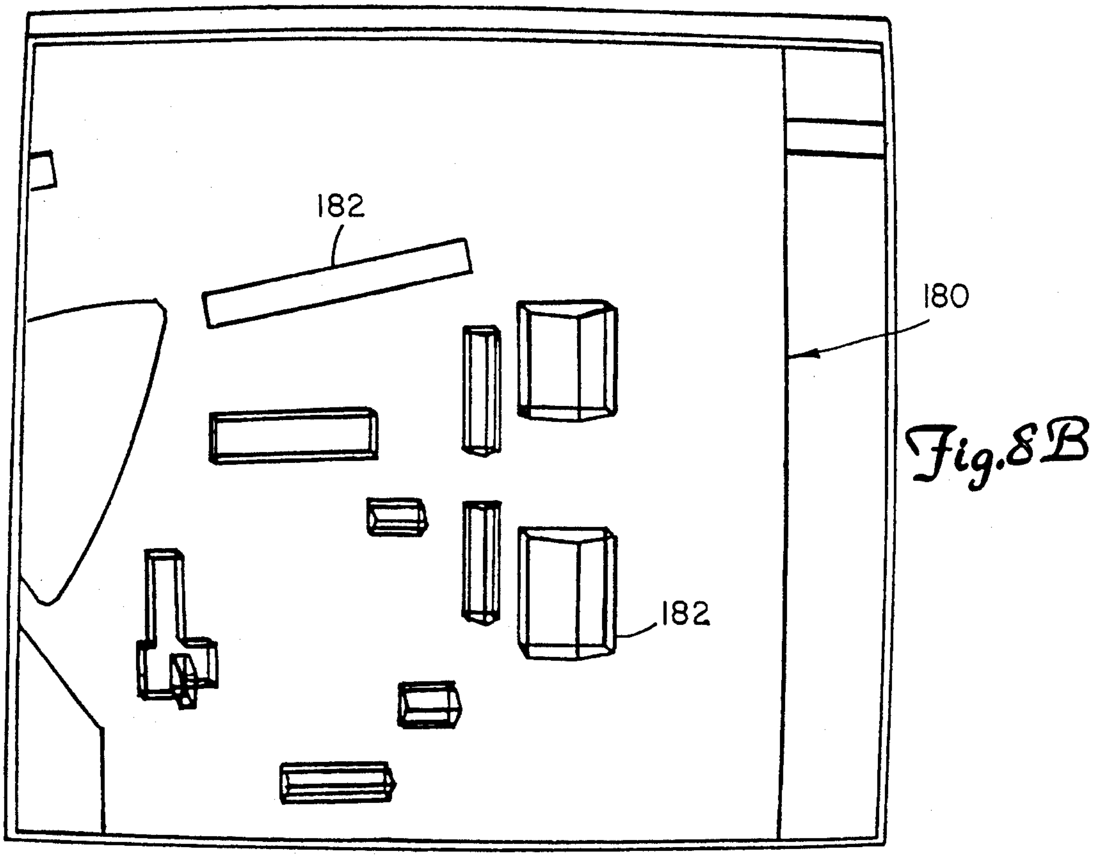

FIG. 8A illustrates a video display 170 of a camera model of a region depicting buildings 172, roads 174, fields 176, automobiles 178, etc. The computer display of FIG. 8A is generated by a camera model program well-known in the art from data inputted from a photograph from a camera. FIG. 8B illustrates a video display 180 of a three-dimensional model depicting projected building configurations 182. The computer display of FIG. 8B is generated by a three-dimensional model program well-known in the art from data obtained from appropriate sensors. Prior to the present invention, displays 170 and 180 were compared by switching the display screen to alternately display outputs from the separate programs generating the displays, or by configuring separate windows to generate displays 170 and 180 in a juxtaposed relation. Since the two displays were not generated by the same program, they could not by overlayed to form a composite display.

The present invention permits overlaying the separate displays to form an overlayed composite display, as shown in FIG. 8C. FIG. 8C is a composite of displays 170 and 180 shown in FIGS. 8A and 8B, and is generated as heretofore described, with display 170 (FIG. 8A) forming the background layer. Pixel 160 is the upper left pixel of background display 170. After the window is opened and display 170 is positioned to the satisfaction of the user, the screen coordinates of pixel 160 are entered into coordinate table 68 (FIG. 3) and are used to determine the offset for display 180 and other foreground displays, as heretofore described. The several layers of the composite display are fused by the common offset coordinates from table 68. Should it become desired to rotate or skew the composite display, rotation or skewing may be accomplished about a common reference point or axis by altering the orientation data in table 68 as heretofore described, thereby effectuating a federated rotation or skew of all the display layers in unison.

The backplane architecture provides for the merger of information and registration of imagery from multiple inputs of a wide variety, including hand-held cameras, keyboard inputs, tapes, databases, discs, etc. Application programs may be added to the federation of application programs without concern to the effect on other programs of the federation. The backplane software controls the overlay of registration of all of the images in concert. With the backplane program of the present invention, a windows environment can be configured to contain the set of tools and information extraction processes to maximize the efficiency of any given task. Thus, the software can be customized without difficulty to a user's needs. Software developers can integrate new application programs into the new federations as well as integrate new data and processes into an existing stack environment. Similarly,-the backplane software provides an efficient user interface to the integrated set of application programs and data. The independently developed application programs are federated with the other programs of the backplane architecture to form a seamlessly integrated display technique. The user interface to each application program remains exactly the same as in the original design, unencumbered by any artifacts imposed as a result of the larger backplane environment. The hyper-extensible nature of the backplane system integration permits a wide range of multi-sensor exploitation of data management.

One feature of the invention resides in the fact that the individual programs are individually processed and need not be compatible with each other, either in code or language. In fact, the individual programs do not need to be processed by the same processor. Thus, several processors executing separate application programs and connected to a single display device may effectuate an overlapped display in a single window in accordance with the present invention.

Another feature of the invention resides in the fact that not all windows of a windowing management system need be operated under the control of a backplane software in accordance with the present invention. Thus, in a windowing system employing plural windows, some or all of the windows may be selectively operating under the control of the backplane software. The windows with overlayed and non-overlayed displays may be occluded, juxtaposed, or positioned in any other configuration, all under control of the windowing management system, as is well known in the art.

The present invention thus provides a windowing system permitting each program to find a window to attach itself in a controlled manner. The drawing of display layers s done so that the foreground layers are drawn last, thereby assuring overlapping pixels are drawn by the highest layer display. Further, input commands from mouse controls and the like may operate one program, without affecting the other programs, yet may also be employed to maneuver the display stack without adversely affecting the individual display layers.

Although the present invention has been described with reference to preferred embodiments, workers skilled in the art will recognize that changes may be made in form and detail without departing from the spirit and scope of the invention.

What is claimed is:

1. A data display system comprising:

a computer display screen having display positions defined by display coordinates, computer processor means for processing a plurality of independent computer application programs, the computer processor means including display generation means responsive to a display generator of each independent computer application program to generate a respective program video display onto the computer display screen commencing at display coordinates assigned by the respective independent computer application program, and backplane means operating the display generation means to generate simultaneous video displays onto the computer display screen from all the display generators, said backplane means including coordinate offset means for offsetting display coordinates assigned by at least a second of said independent computer application programs to match display coordinates of a first of said independent computer application programs to thereby display the program video displays of the first and second independent computer application programs in registration as a composite video display.

2. Apparatus according to claim 1 wherein said coordinate offset means includes table means containing offset coordinate data, the display generation means being respective to the display coordinates assigned by the second independent computer application program and to said offset coordinate data to generate the program video display from the second independent computer application program on the computer display screen at display coordinates defined by the display coordinates assigned by the second independent computer application program as offset by said offset coordinate data.

3. Apparatus according to claim 2 wherein a background display forming a first layer of said composite video display is generated under control of the first independent computer application program and a foreground display forming a second layer of said composite video display is generated under control of the second independent computer application program, the background display including a predetermined pixel at display coordinates defined by said first independent computer application program, the table means being responsive to the display coordinates of said predetermined pixel to provide said offset coordinate data.

4. Apparatus according to claim 3 wherein the plurality of independent computer application programs include a plurality of second independent computer application programs each generating a foreground display forming a respective second layer of said composite display, the display generation means being responsive to the display coordinates assigned by each of said second independent computer application programs and to the offset coordinate data.

5. Apparatus according to claim 2 wherein each independent computer application program includes a display matrix having independent application program orientation data defining an orientation of the respective program video display on the computer display screen, said table means containing composite display orientation data, each of said independent computer application programs being responsive to said composite display orientation data to generate its respective program video display on said computer display screen at an orientation defined by said independent application program orientation data as offset by said composite display orientation data.

6. Apparatus according to claim 2 wherein the computer processor means is responsive to a program draw command from each independent computer application program to initiate a respective program video display, said computer processor means further including interrupt means for interrupting program draw commands, said backplane means being responsive to said interrupt means to issue a backplane draw command and offset coordinate data to the display generation means, the display generation means being responsive to the backplane draw command to generate the respective program video display from the independent computer application program having the interrupted program draw command.

7. Apparatus according to claim 6 wherein the independent computer application programs are arranged to generate respective program video displays in a layered stack, said backplane means including stack control means for uniformly altering all program video displays forming the composite video display.

8. Apparatus according to claim 7 wherein each independent computer application program issues a draw done command upon generation of its respective program video display, the backplane means being responsive to a draw done command to issue a backplane draw command and offset coordinate data to the independent computer application program having the next higher layered program video display.

9. Apparatus according to claim 2 wherein a background display forming a first layer of said composite video display is generated under control of the first independent computer application programs and a plurality of foreground displays forming respective second layers of said composite video display are generated by respective second independent computer application programs, the background display including a predetermined pixel at display coordinates defined by said first independent computer application program, the layers of foreground displays being prioritized, and wherein each independent computer application program issues a respective draw done command upon generation of its respective program video display, the table means being responsive to the display coordinates of the predetermined pixel generated by the first independent computer application program to provide said offset coordinate data, the backplane means being responsive to a draw done command from the first independent computer application program to issue a backplane draw command to the second independent computer application program generating a foreground display having the lowest priority layer, and the backplane means being responsive to a draw done command from a second independent computer application program generating a second layer of one priority to issue a backplane draw command to the second independent computer application program generating a foreground display having the next higher priority layer.

10. Apparatus according to claim 9 wherein each independent computer application program includes a display matrix having independent application program orientation data defining an orientation of the respective program video display on the computer display screen, said table means containing composite display orientation data, each of said independent computer application programs being responsive to said composite display orientation data to generate its respective program video display on said computer display screen at an orientation defined by said independent application program orientation data as offset by said composite display orientation data, said backplane means including means for altering the composite display orientation data to thereby uniformly alter the orientation of all program video display to thereby alter the orientation of the composite video display.

11. Apparatus according to claim 10 wherein the orientation data contained in said table means comprises three-dimensional orientation data associated with said background display generated under control of said first of said independent computer application programs.

12. Apparatus according to claim 1 wherein each independent computer application program includes a display matrix having independent application program orientation data defining an orientation of the respective program video display on the computer display screen, said coordinate offset means further including table means containing composite display orientation data, each of said independent computer application programs being responsive to said composite display orientation data to generate its respective program video display on said computer display screen at an orientation defined by said independent application program orientation data as offset by said composite display orientation data.

13. Apparatus according to claim 1 further including selection means for selecting one or more of said plurality of independent computer application programs, said backplane means operating the display generators associated with the selected independent computer application programs to generate said composite video display consisting of the registered program video displays generated by the selected independent computer application programs.

14. Apparatus according to claim 1 further including an input device connected to the backplane means for providing input events, each independent computer application program including interface means for receiving the input events, said backplane means further including routing means for routing input events received from the input device to the interface means of a selected independent application computer program.

15. Apparatus according to claim 14 wherein the backplane means arranges the respective program displays generated by the independent computer application programs in a layered stack, said routing means routing input events to the independent computer applications program whose programs video display is at the highest layer in the stack, said back plane means including stack control means for altering the order of layers of the stack.

16. Apparatus according to claim 13 wherein the input device comprises a mouse control having an associated cursor display arranged to move across display coordinates of the computer display screen, the mouse control being operable to input data to the independent computer application program whose program video display is at the highest layer in the stack, the data input being associated with display coordinates of the position of the cursor corrected for the offset accomplished by the offset means.

17. Apparatus according to claim 1 wherein the backplane means arranges the respective program video displays generated by the independent computer application programs in a layered stack, said backplane means including stack control means for uniformly altering all program video displays forming the composite video display.

18. Apparatus according to claim 17 wherein said stack control means includes means for altering the order of layers of the stack.

19. Apparatus according to claim 1 further including windowing management means for managing a computer display window on said computer display screen, said back plane means operating the display generation means of each of the plurality of independent computer application programs to generate a composite video display onto said window.

20. A computer display management system for displaying a composite video display on a computer display screen, the composite video display comprising a registered composite of a plurality of program video displays, each of said program video displays being generated under control of a separate one of a plurality of independent application programs, each of said independent application programs having a display generation routine operable in response to a draw command to generate its respective program video display at display coordinates on the computer display screen assigned by the respective independent application program, said computer display management system comprising, in combination:

- a computer display screen having display positions defined by display coordinates;
- a computer processor for processing the plurality of independent application programs, the computer processor including:
  - display generation means responsive to the display generation routines of each independent application program to operate the computer display screen to simultaneously display the respective program video display,
  - interrupt means for interrupting draw commands,
  - backplane means responsive to an interrupted draw command for issuing a backplane redraw command to the independent application program having the interrupted draw command, and
  - coordinate offset means providing offset coordinate data representing coordinates of the display screen of a program video display of a selected independent application program, each of the other independent application programs being responsive to the backplane redraw command and to the offset coordinate data to execute its respective display generation routine to modify the display coordinates assigned by the independent application program by an amount defined by the offset coordinate data and to generate its respective program video display at display coordinates defined by the modified coordinates to thereby display all of the program video displays in registration as a composite video display.

21. A computer display management system according to claim 20 wherein each independent application generates program display coordinates defining the location on the display screen where a respective program video display is to be generated, said coordinate offset means including table means containing the offset coordinate data, the display generation routine of at least one of said independent application programs being responsive to the backplane redraw command to and to said offset coordinate data to generate its respective program video display at display coordinates defined by the display coordinates defined by the respective independent application program as offset by said offset coordinate data.

22. A computer display management system according to claim 21 wherein a background display forming a first layer of said composite display is generated under control of a first of said independent application programs and a foreground display forming a second layer of said composite display is generated under control of a second of said independent application programs, the background display including a predetermined pixel at display coordinates defined by said first independent application program, the table means being responsive to the display coordinates of the predetermined pixel to provide said offset coordinate data.

23. A computer display management system according to claim 22 wherein the plurality of independent application programs include a plurality of second independent application programs each generating a foreground display forming a respective second layer of said composite display, the display generation means being responsive to the display coordinates assigned by each of said second independent application programs and to the offset coordinate data.

24. A computer display management system according to claim 22 wherein the display generation routine of said second independent application program is responsive to the offset coordinate data.

25. A computer display management system according to claim 22 wherein the backplane means arranges the respective program video displays generated by the independent application programs in a layered stack, said backplane means including stack control means for uniformly altering all program video displays forming the composite video display.

26. A computer display management system according to claim 25 wherein each independent application program issues a draw done command upon generation of the respective program video display, the backplane means being responsive to a draw done command to issue a backplane redraw command and offset coordinated data to the independent application program having the next higher layered program video display.

27. A computer display management system according to claim 21 wherein a background display forming a first layer of said composite video display is generated under control of a first of said independent application programs and a plurality of foreground displays forming respective second layers of said composite video display are generated under the control of respective ones of a plurality of second independent application programs, the background display including a predetermined pixel at display coordinates defined by said first independent application program, the layers of foreground displays being prioritized, and wherein each independent application program issues a respective draw done command upon generation of its respective program video display, the table means being responsive to the display coordinates of the predetermined pixel generated by the first independent application program to provide said offset coordinate data, the backplane means being responsive to a draw done command from the first independent application program to issue a backplane redraw command to the second independent application program generating a foreground display having the lowest priority layer, and the backplane means being responsive to a draw done command from a second independent application program generating a second layer of one priority to issue a backplane redraw command to the second independent application program generating a foreground display having the next higher priority layer.

28. A computer display management system according to claim 27 wherein each independent application program includes a display matrix having independent application program orientation data defining an orientation of the respective program video display on the computer display screen, said table means containing composite display orientation data, each of said independent application programs being responsive to the backplane redraw command and to the composite display orientation data to generate its respective program video display on said computer display screen at an orientation defined by said independent application program orientation data as offset by said composite display orientation data, said backplane means including means for altering the composite display orientation data to thereby uniformly alter the orientation of all program video display to thereby alter the orientation of the composite video display.

29. A computer display management system according to claim 28 wherein the composite display orientation data contained in said table means comprises three-dimensional orientation data associated with said background display generated under control of said first of said independent computer application programs.

30. A computer display management system according to claim 21 wherein each independent application program includes a display matrix having independent application program orientation data defining an orientation of the respective program video display on the computer display screen said table means containing composite display orientation data, each of said independent application programs being responsive to the backplane redraw command and to said composite display orientation data to generate its respective program video display on said computer display screen at an orientation defined by said independent application program orientation data as offset by said composite display orientation data.

31. A computer display management system according to claim 20 wherein each independent application program includes a display matrix having independent application program orientation data defining an orientation of the respective program video display on the computer display screen, said backplane means further including table means containing composite display orientation data, each of said independent application programs being responsive to the backplane redraw command and to said composite display orientation data to generate its respective program video display on said computer display screen at an orientation defined by said independent application program orientation data as offset by said composite display orientation data.

32. A computer display management system according to claim 20 further including an input device connected to the backplane means for providing input events, each independent application program including interface means for receiving the input events, said backplane means further including routing means for routing input events received from the input device to the interface means of a selected independent application program.

33. A computer display management system according to claim 32 wherein the backplane means arranges the respective program displays generated by the independent application programs in a layered stack, said routing means routing input events to the independent application program whose program video display is at the highest layer in the stack, said backplane means including stack control means for altering the order of layers of the stack.

34. Apparatus according to claim 33 wherein the input device comprises a mouse control having an associated cursor display arranged to move across display coordinates of the computer display screen, the mouse control being operable to input data to the independent application program whose program video display is at the highest layer in the stack, the data input being associated with display coordinates of the position of the cursor corrected for the offset accomplished by the offset means.

35. A computer display management system according to claim 20 wherein the backplane means arranges the respective program displays generated by the independent application programs in a layered stack, said backplane means including stack control means for uniformly altering all program video displays forming the composite video display.

36. A process of generating a composite video display onto a computer display screen, the composite video display comprising a composite of a plurality of independent program video displays each generated in registration under control of a respective independent computer program processed by computer processor means, each independent computer program being operable in response to a draw command to initiate display of its respective independent program video display on the computer display screen at coordinates of the computer display screen provided by the respective independent computer program, said process comprising:

displaying the program video display generated under control of a first independent computer program, interrupting the draw command of a second independent computer program, offsetting the coordinates provided by the second independent computer program by an amount based on the coordinates of the program video display generated under control of the first independent computer program, issuing a redraw command in response to interruption of a draw command of the second independent computer program to operate the second independent computer program to display its respective independent program video display on the computer display screen at coordinates defined by the offset coordinates, and simultaneously displaying the program video display generated under the control of the second independent computer program in registration with the program video display generated under the control of the first independent computer program as a composite video display.

37. The process according to claim 36 including generating a background display forming a first layer of said composite display under control of a first independent computer program and generating a foreground display forming a second layer of said composite display under control of a second independent computer program, the background display including a predetermined pixel at display screen coordinates defined by the first independent computer application program, defining the selected amount of offset from the display screen coordinates of the predetermined pixel, the coordinates provided by the second independent computer program being offset by the selected amount.

38. The process according to claim 37 including generating a plurality of foreground displays each forming a respective second layer of the composite display under control of respective ones of a plurality of second independent computer programs, the coordinates provided by each second independent computer program being offset by the selected amount, prioritizing the second layers, and issuing a redraw command in response to a draw done command from an independent computer program to operate that second independent computer program having the next higher priority layer to display its respective independent program video display on the computer display screen at coordinates defined by the offset coordinates.

39. The process according to claim 38 wherein each independent computer program includes a display matrix defining an orientation of the respective program video display on the computer display screen, the process further including offsetting the orientation of the program video display of each independent computer program to which a redraw command is issued.

40. The process according to claim 39 further including defining three-dimensional orientation data associated with the background display, and the offsetting of the orientation of the plurality of foreground displays is accomplished by offsetting orientation data associated with each of said foreground displays with orientation data associated with the background display.

41. The process according to claim 36 wherein each independent computer program includes a display matrix defining an orientation of the respective program video display on the computer display screen, the process further including offsetting the orientation of the program video display of each independent computer program to which a redraw command is issued.

42. The process according to claim 36 further including arranging the video displays in a layered stack and routing input events to the independent computer program whose program display is at the top of the stack, moving a control cursor across the computer display screen to a selected position, and inputting data to the independent computer program whose display is at the top of the stack at coordinates corresponding to the position on the computer display screen corrected for the offset based on the coordinates of the program video display generated under control of the first independent computer program.

* * * * *

UNITED STATES PATENT AND TRADEMARK OFFICE
CERTIFICATE OF CORRECTION

PATENT NO. : 5,233,686

DATED : August 3, 1993

INVENTOR(S) : BRENT L. RICKENBACH, THOMAS E. ROSENTHAL

It is certified that error appears in the above-identified patent and that said Letters Patent is hereby corrected as shown below:

Col. 16, line 56, delete "claim 13", insert --claim 15--

Col. 17, line 11, delete "back plane", insert --backplane--

Signed and Sealed this

Eighth Day of March, 1994

*Attest:*

BRUCE LEHMAN

*Attesting Officer*

*Commissioner of Patents and Trademarks*